(12) United States Patent
Pergande et al.

(10) Patent No.: US 9,995,631 B2
(45) Date of Patent: Jun. 12, 2018

(54) SYSTEM AND METHOD TO MONITOR SEMICONDUCTOR WORKPIECE TEMPERATURE USING THERMAL IMAGING

(71) Applicant: Varian Semiconductor Equipment Associates, Inc., Gloucester, MA (US)

(72) Inventors: Paul E. Pergande, Austin, TX (US); Gary E. Wyka, Cedar Park, TX (US); Aaron Webb, Austin, TX (US)

(73) Assignee: Varian Semiconductor Equipment Associates, Inc., Gloucester, MA (US)

( * ) Notice: Subject to any disclaimer, the term of this patent is extended or adjusted under 35 U.S.C. 154(b) by 175 days.

(21) Appl. No.: 15/239,350

(22) Filed: Aug. 17, 2016

(65) Prior Publication Data

US 2017/0356807 A1 Dec. 14, 2017

Related U.S. Application Data

(60) Provisional application No. 62/348,581, filed on Jun. 10, 2016.

(51) Int. Cl.
*G01J 5/08* (2006.01)
*H04N 5/33* (2006.01)

(52) U.S. Cl.
CPC . *G01J 5/08* (2013.01); *H04N 5/33* (2013.01)

(58) Field of Classification Search
None
See application file for complete search history.

(56) References Cited

U.S. PATENT DOCUMENTS

| 7,768,637 | B2* | 8/2010 | Schupp | G01N 21/9503 356/237.5 |
| 2006/0086815 | A1* | 4/2006 | Kang | G01J 5/0003 236/94 |
| 2010/0045955 | A1* | 2/2010 | Vladimirsky | G01N 21/94 355/70 |
| 2013/0043405 | A1* | 2/2013 | Maxwell | G01N 21/6489 250/459.1 |
| 2014/0374597 | A1* | 12/2014 | Panjwani | G01J 5/046 250/338.4 |
| 2015/0226611 | A1* | 8/2015 | Busche | H01L 21/6833 374/121 |

* cited by examiner

*Primary Examiner* — Christopher Findley
(74) *Attorney, Agent, or Firm* — Nields, Lemack & Frame, LLC (57) ABSTRACT

An improved system for measuring the temperature of a plurality of workpieces in a rotating semiconductor processing device is disclosed. Because silicon has variable emissivity in the infrared band, a temperature stable, high emissivity coating is applied to a portion of the workpiece, allowing the temperature of the workpiece to be measured by observing the temperature of the coating. Further, by limiting the amount of coating applied to the workpiece, the effect of the coating on the intrinsic temperature of the workpiece and the surrounding semiconductor processing device may be minimized. The temperature of the workpieces is measured as the workpieces pass under an aperture by capturing a thermal image of a portion of the workpiece. In certain embodiments, a controller is used to process the plurality of thermal images into a single thermal image showing all of the workpieces disposed within the semiconductor processing device.

20 Claims, 9 Drawing Sheets

SYSTEM AND METHOD TO MONITOR SEMICONDUCTOR WORKPIECE TEMPERATURE USING THERMAL IMAGING

This application claims priority to U.S. Provisional Patent Application Ser. No. 62/348,581, filed Jun. 10, 2016, the disclosure of which is incorporated herein by reference in its entirety.

FIELD

This disclosure relates to temperature measurement of workpieces, more particularly, to temperature measurements of silicon workpieces within a processing chamber using infrared sensors.

BACKGROUND

Many current semiconductor processes are performed at a temperature that is different than ambient temperature. For example, certain processes may be best performed in a cold environment, such as below 0° C., while others are best performed in a hot environment, such as above 500° C. Often, it is not the temperature of the ambient environment, but rather the actual temperature and/or the temperature uniformity of the workpiece that is of interest. Thus, monitoring the temperature of the workpiece itself may be beneficial.

Techniques for workpiece temperature measurement are limited by the parameters of the processing environment. For example, thermocouples attached to the workpiece are impractical if the workpiece moves. Alternatively, thermocouples mounted to the supporting structure are of limited use, as the temperature of the supporting structure may differ from that of the workpiece due to problems associated with establishing good thermal contact between the supporting structure and the workpiece. Additionally, the optical properties of silicon make the application of common infrared techniques difficult or impossible. Specifically, at certain temperatures, silicon is nearly transparent at infrared frequencies, making it difficult to determine the actual temperature of the workpiece. Rather, in these instances, the infrared system is often monitoring the temperature of the surfaces adjacent to the workpiece, rather than the workpiece itself.

In some semiconductor processing devices, the workpieces may be rotated relative to an aperture, so that only a portion of the total workpiece is visible at any particular time. Thus, monitoring the temperature of the workpieces is further complicated by the inability to continuously monitor the entire workpiece.

Thus, any system or method that allows for measurement of the temperature of a workpiece in a process chamber would be beneficial. Further, it would be beneficial if the temperature of multiple workpieces within a rotating semiconductor processing device could be monitored simultaneously.

SUMMARY

An improved system for measuring the temperature of a plurality of workpieces in a rotating semiconductor processing device is disclosed. Because silicon has variable emissivity in the infrared band, a temperature stable, high emissivity coating is applied to a portion of the workpiece, allowing the temperature of the workpiece to be measured by observing the temperature of the coating. Further, by limiting the amount of coating applied to the workpiece, the effect of the coating on the intrinsic temperature of the workpiece and the surrounding semiconductor processing device may be minimized. The temperature of the workpieces is measured as the workpieces pass under an aperture by capturing a thermal image of a portion of the workpiece. In certain embodiments, a controller is used to process the plurality of thermal images into a single thermal image showing all of the workpieces disposed within the semiconductor processing device.

According to one embodiment, an apparatus for capturing a thermal image of a workpiece is disclosed. The apparatus comprises a workpiece processing device having a process chamber and an observation window; a workpiece disposed in the process chamber, the workpiece having a coating disposed on a portion of a surface; an infrared camera disposed outside the process chamber and adapted to capture thermal images of the workpiece in the process chamber through the observation window; and a controller, in communication with the infrared camera, wherein the infrared camera captures a plurality of thermal images of the workpiece, and transmits the plurality of thermal images to the controller; and wherein the controller assembles the plurality of thermal images into a single complete thermal image showing an entirety of the workpiece. In certain embodiments, the workpiece processing device comprises a rotating plate on which the workpiece is disposed, such that the workpiece moves relative to the infrared camera, and the thermal images capture a portion of the workpiece, less than an entirety of the workpiece. In certain embodiments, the workpiece processing device also comprises a baseplate disposed between the rotating plate and the infrared camera, the baseplate having an aperture therein such that only the portion of the workpiece disposed beneath the aperture is visible to the infrared camera. In certain further embodiments, the apparatus comprises a light blocking structure, having an open base and a top surface with a viewing aperture, the light blocking structure disposed in the process chamber with the base of the light blocking structure disposed on the aperture in the baseplate, and the infrared camera positioned so that an optical axis of the infrared camera passes through the viewing aperture. In certain embodiments, a light trap is disposed on an interior surface of the light blocking structure. In certain embodiments, the viewing aperture comprises a material transparent to infrared light, and the viewing aperture is not orthogonal to an optical axis of the infrared camera.

According to one embodiment, an apparatus for capturing a thermal image of a workpieces disclosed. The apparatus comprises a workpiece processing device having a process chamber, the process chamber defined by a lid and a baseplate; the baseplate having an aperture therein, the aperture configured to be smaller than a workpiece; a rotating plate disposed beneath the baseplate; a workpiece disposed on the rotating plate, the workpiece having a coating disposed on a portion of a surface; an infrared camera disposed outside the process chamber and adapted to capture thermal images of the workpiece through an observation window in the lid, wherein an optical axis of the infrared camera passes through the observation window and the aperture in the baseplate; and a controller, in communication with the infrared camera, wherein the infrared camera captures a plurality of thermal images of the workpiece as the workpiece moves on the rotating plate, and transmits the plurality of thermal images to the controller; and wherein the controller assembles the plurality of thermal images into a single complete thermal image showing an entirety of the workpiece. In certain embodiments, the apparatus comprises a light blocking structure, having an open base and a top surface with a viewing aperture, the light blocking structure disposed in the process chamber with the base of the light blocking structure disposed on the aperture in the baseplate, and the infrared camera positioned so that the optical axis of the infrared camera passes through the viewing aperture. In certain further embodiments, the viewing aperture comprises a material transparent to infrared light, and the viewing aperture is not orthogonal to an optical axis of the infrared camera. In certain embodiments, an inside surface of the light blocking structure is coated with a low emissivity coating. In certain embodiments, the light blocking structure comprises a plurality of walls constructed of a material that do not permit passage of infrared light. In certain embodiments, a light trap is disposed on an interior surface of the light blocking structure. In certain embodiments, the light trap comprises a plurality of low emissivity members and surfaces arranged in parallel and attached to an interior surface of a side of the light blocking structure. In some embodiments, the rotating plate holds a plurality of workpieces, and the controller creates a complete thermal image showing all of the plurality of workpieces disposed on the rotating plate. In certain embodiments, the coating covers less than 20% of a total surface of the workpiece.

According to one embodiment, a temperature measurement system is disclosed. The temperature measurement system comprises an infrared camera, a rotating plate to hold a workpiece, the workpiece having a coating disposed on a portion of the workpiece, less than an entirety of the workpiece, wherein the workpiece moves relative to the infrared camera; and a controller in communication with the infrared camera, wherein the infrared camera captures a plurality of thermal images of the workpiece, where each thermal image captures less than an entirety of the workpiece, and transmits the plurality of thermal images to the controller and wherein the controller assembles the plurality of thermal images into a single complete thermal image showing an entirety of the workpiece. In certain further embodiments, position information of the rotating plate is associated with each of the plurality of thermal images and the controller uses the position information to create the single complete thermal image. In certain embodiments, time information is associated with each of the plurality of thermal images and the controller uses the time information to create the single complete thermal image. In certain embodiments, adjacent thermal images have an overlapping portion, and the controller uses image matching to create the single complete thermal image. In certain embodiments, the coating covers less than 20% of a total surface of the workpiece.

BRIEF DESCRIPTION OF THE DRAWINGS

For a better understanding of the present disclosure, reference is made to the accompanying drawings, which are incorporated herein by reference and in which.

DETAILED DESCRIPTION

As described above, the optical properties of silicon make the use of infrared techniques to measure absolute temperature of a workpiece difficult. Emissivity is a measure of a material's ability to emit energy via radiation. At certain temperatures, silicon emissivity changes rapidly and makes the use of infrared imaging an unstable technique to accurately measure the absolute temperature. As the temperature of the silicon increases, the emissivity of the silicon also increases. At 800° C., the emissivity of silicon is nearly constant at close to 0.7. This optical behavior is problematic for several reasons.

First, at a particular wavelength in the infrared spectrum, the emissivity of silicon changes as a function of its temperature. Therefore, using an infrared camera that operates at a single wavelength or a narrow range of wavelengths, it is difficult or even impossible to relate the emitted radiation to an actual temperature. Infrared cameras typically measure emitted radiation at a particular wavelength or narrow range of wavelengths, and based on the amount of emitted radiation and the emissivity of the material, determine the material's temperature. A non-constant measurement at that particular wavelength makes it difficult for an infrared camera to determine the material's temperature using only one wavelength. Thus, traditional IR cameras are unable to accurately determine the temperature of silicon at temperatures below 800° C.

Second, the good transmission properties of silicon at low temperatures means that any infrared measurements that are recorded are actually associated with the material disposed beneath the silicon.

Thus, the use of a coating on the workpiece which has a constant or nearly constant emissivity in the infrared spectrum may be employed. In this disclosure, the term "nearly constant emissivity" denotes that the emissivity of the material changes less than 20% over a desired temperature range. In other embodiments, the material may have emissivity changes of less than 10% over the desired temperature range. In other embodiments, the material may have emissivity changes of less than 5% over the desired temperature range. An IR camera typically uses a fixed emissivity value. By selecting a coating having a constant or nearly constant emissivity over the temperature range of interest, the readings recorded by the IR camera may be more accurate.

Figure 1A:
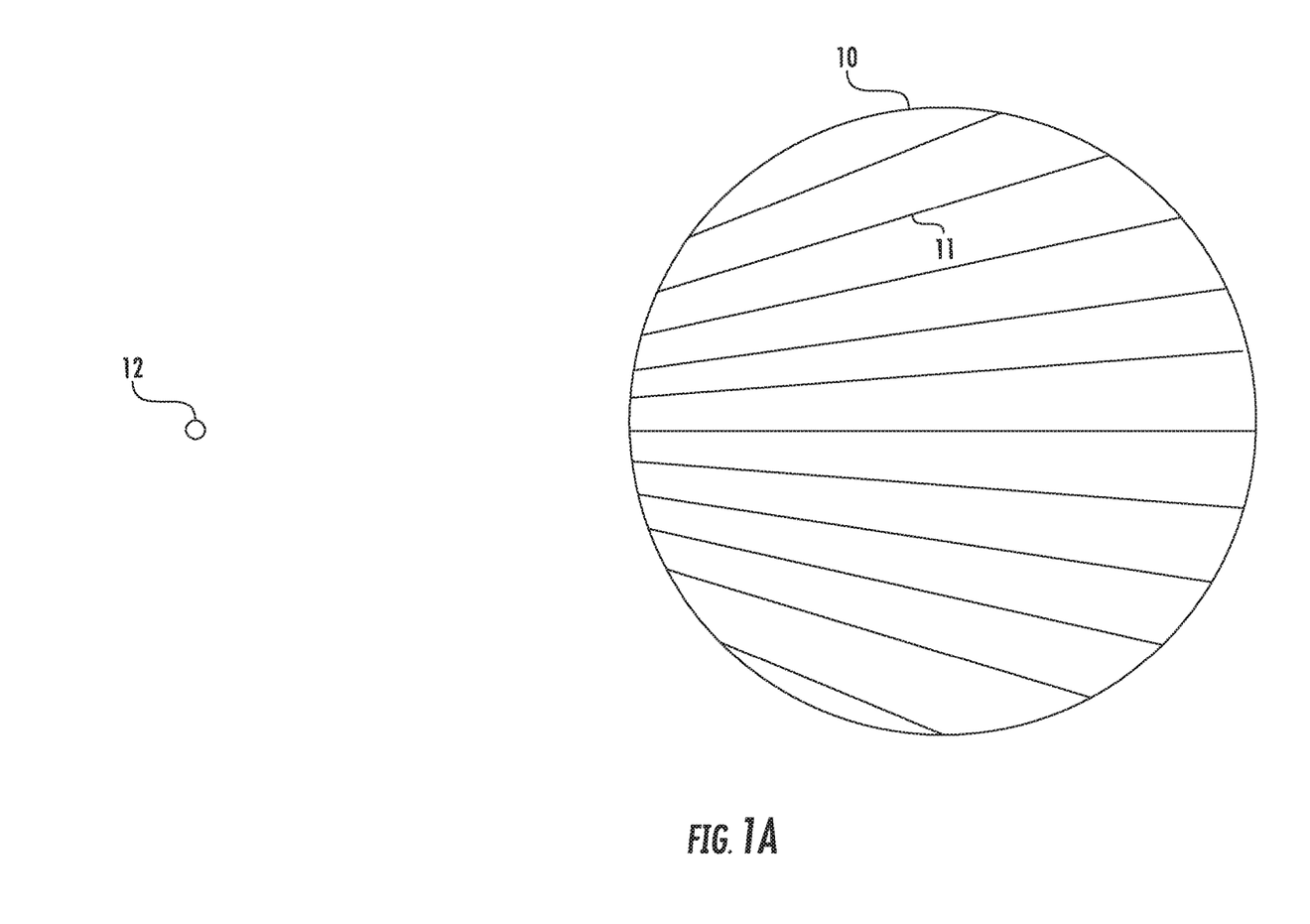
FIG. 1A shows a workpiece with a coating applied in a first pattern.
Figure 1B:
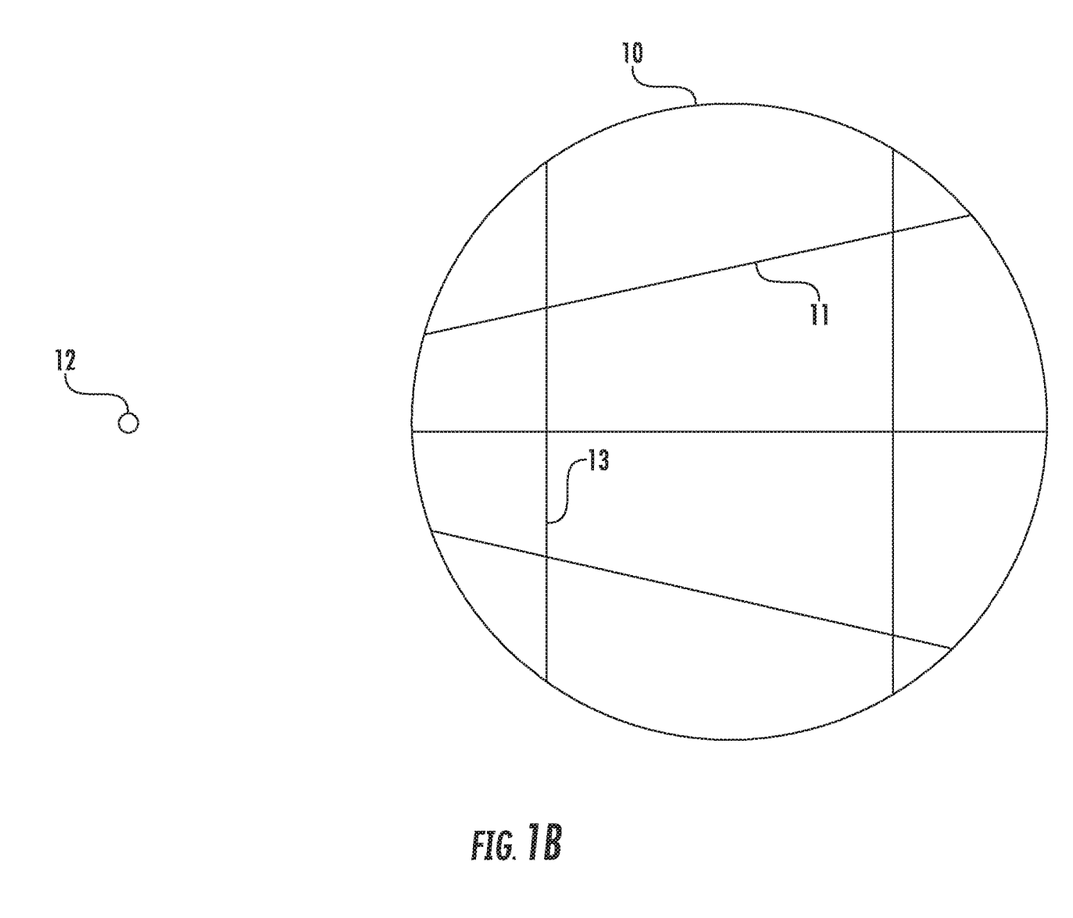
FIG. 1B shows a workpiece with a coating applied in a second pattern.

FIG. 1A shows a workpiece 10 with a coating applied in a first pattern. The first pattern comprises a set of spokes 11, which may each be a portion of a radius of a large circle, having its center 12 to the left of the workpiece 10. This center 12 may correspond to the center of the rotating plate 110 (see FIG. 3). FIG. 1B shows a workpiece 10 with a coating applied in a second pattern. The second pattern comprises a set of spokes 11, which may each be a portion of a radius of a large circle, having its center 12 to the left of the workpiece 10. The second pattern may contain fewer spokes 11 than the first pattern. The second pattern may also have one or more intersecting lines 13 which cross one or more of the spokes 11.

By applying a pattern of spokes 11 and/or intersecting lines 13, the temperature at a plurality of locations on the workpiece 10 may be measured. Further, by limiting the amount of coating that is applied to the workpiece 10, the coating has a minimal effect on the intrinsic temperature of the workpiece 10. In other words, the application of the coating may affect the temperature of the workpiece, relative to an uncoated workpiece. For example, in the present semiconductor processing device, the workpieces are disposed in close proximity to other components. The coating may absorb heat from these neighboring components, changing the temperature of the workpiece 10. By minimizing the applied pattern, this effect may be reduced. For example, in certain embodiments, the coating covers less than 20% of the total surface of the workpiece 10. In other embodiments, the coating may occupy less than 10% of the total surface of the workpiece.

Figure 6:
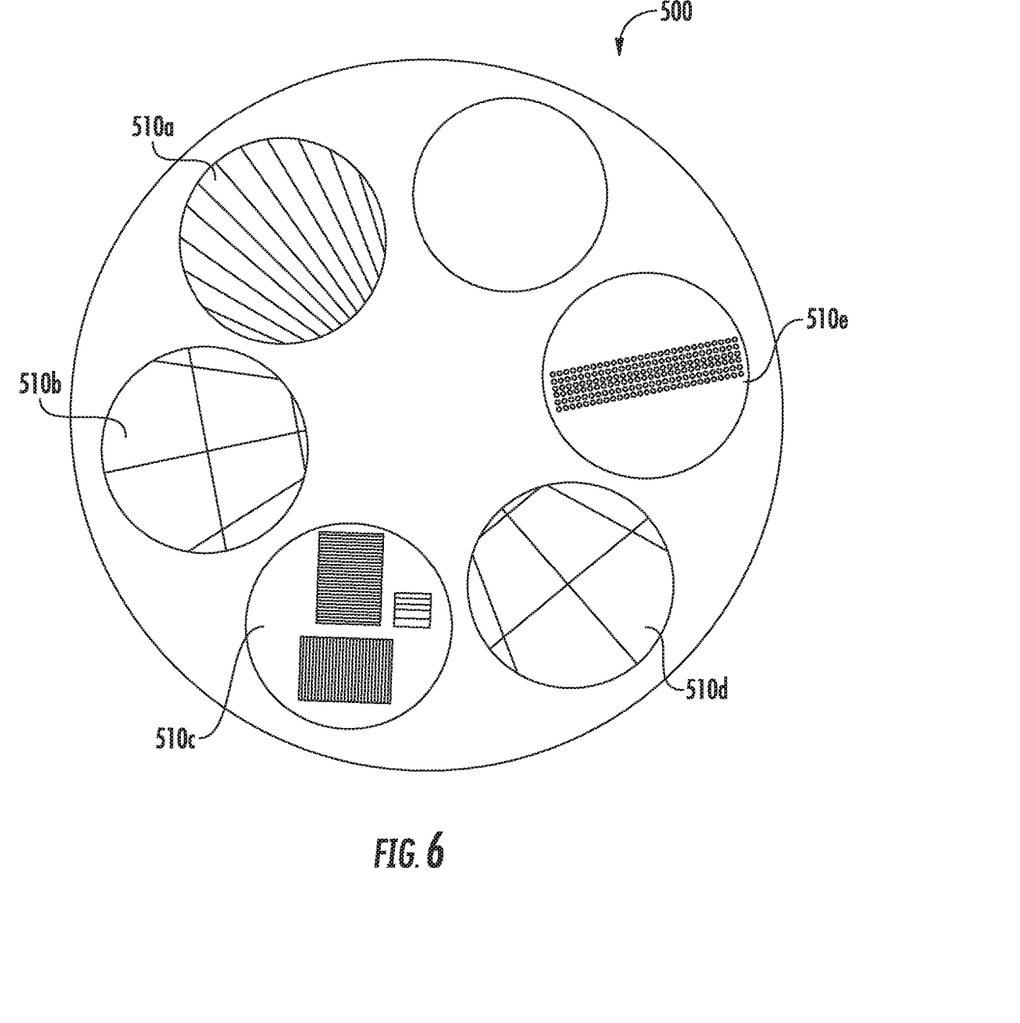
FIG. 6 shows a thermal image of all of the workpieces disposed in the rotating plate of FIG. 2.

It is noted that while FIGS. 1A-1B show two patterns of coating, the disclosure is not limited to these patterns. Other patterns may also be used. Some of these patterns are also shown in FIG. 6. Other embodiments are also possible. One such pattern is a checkerboard pattern, where a grid like pattern of coating is applied to the workpiece. Another such pattern may be a spiral pattern, where curved lines radiate outward from the center of the workpiece. Another such pattern is a spoke pattern, where spokes radiate outward from the center of the workpiece. Further, while FIGS. 1A-1B show patterns which are less than the entire surface of the workpiece, in certain embodiments, the entire workpiece 10 may be coated. Thus, the specific pattern of coating that is to be applied to the workpiece 10 is not limited by this disclosure.

In certain embodiments, the coating is applied in lines that are thick enough to be viewed by an infrared camera. For example, in certain embodiments, the lines have a thickness that is at least 2 pixels wide, when viewed by the infrared camera. The actual physical thickness of each line may be determined based on the focal length and the resolution of the infrared camera.

The coating may be any suitable material that is compatible with semiconductor processes, and has high and nearly constant emissivity across the temperature range of interest. The coating is selected such that the coating does not outgas any material that could contaminate a semiconductor tool, or any other materials that could flake off and create particles or other contaminants inside of the tool. In certain embodiments, the emissivity of the coating may only be nearly constant in a specific temperature range. For example, if the workpiece is disposed in a heated chamber, the emissivity of the coating may only be constant at higher temperatures. Thus, it is advantageous that the coating have high and nearly constant emissivity in the temperature range of interest.

The coating may be applied to the workpiece 10 in a number of ways. The coating may be painted onto the workpiece 10. In other embodiments, the coating may be sprayed onto the workpiece 10 and then baked. In certain embodiments, a stencil may be applied to the workpiece 10, and the coating is applied through the stencil. The coating may then be cured and the stencil removed. In certain embodiments, the polished surface of the workpiece 10 can be roughened to provide a diffuse surface for the coating to build upon. After the surface is roughened, the coating may be painted or sprayed onto the workpiece 10.

Figure 2:
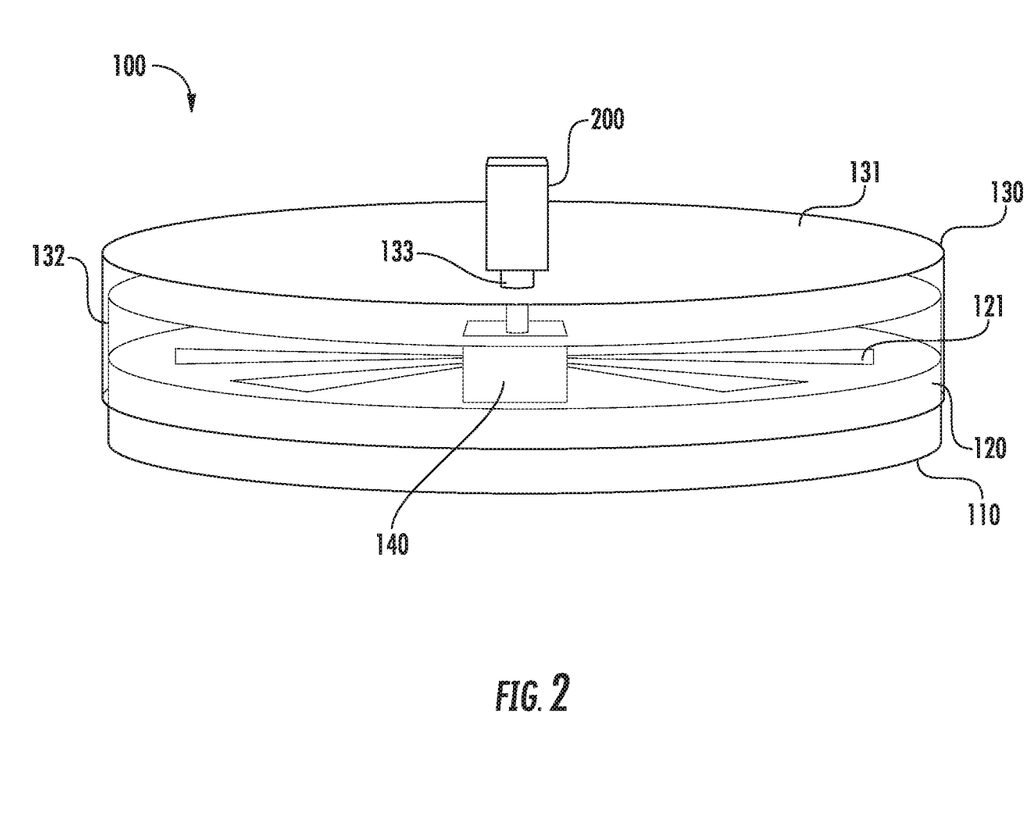
FIG. 2 shows a semiconductor processing device with a temperature measurement system according to one embodiment.

FIG. 2 shows a semiconductor processing device 100 where the temperature measurement system may be employed. The semiconductor processing device 100 comprises a rotating plate 110. This rotating plate 110 may hold one or more workpieces. In the present figures, the rotating plate 110 may hold six workpieces. However, this is merely for illustrative purposes, and the temperature measurement system is not limited to any particular configuration of the semiconductor processing device 100.

The rotating plate 110 may be constructed of graphite, although other materials may also be used. The rotating plate 110 may have embedded temperature controls. These temperature controls may allow the rotating plate 110 to heat the workpieces in certain embodiments. For example, heating elements may be embedded in the rotating plate 110. In other embodiments, these temperature controls may allow the rotating plate 110 to cool the workpieces. For example, channels may be disposed within the rotating plate 110. Cooling fluid may pass through these channels, removing heat from the workpieces. The rotating plate 110 is rotated through the use of a motor.

A baseplate 120 is disposed above the rotating plate 110. The baseplate 120 has one or more apertures 121 disposed therein. In the figures, these apertures 121 are shown as wedge shaped, although other shapes may also be used. A lid 130 is disposed on the baseplate 120, creating a process chamber between the lid 130 and the baseplate 120. The lid 130 may have a top surface 131 with sidewalls 132 extending downward from the top surface 131. The sidewalls 132 may contact the baseplate 120, sealing the process chamber. In other words, the process chamber is defined as the volume between the baseplate 120, the top surface 131 and the sidewalls 132. In certain embodiments, the baseplate 120 and the lid 130 may be made of a suitable material, such as aluminum.

Within the process chamber, various activities may be performed. For example, more or more feed gasses may be introduced into the process chamber. These feed gasses may be ionized and the ions may be deposited onto the workpieces through the apertures 121 in the baseplate 120. In one embodiment, atomic layer deposition (ALD) is performed using this semiconductor processing device 100. Of course, other processes may also be performed and the function of the semiconductor processing device 100 is not limited by this disclosure.

Figure 3:
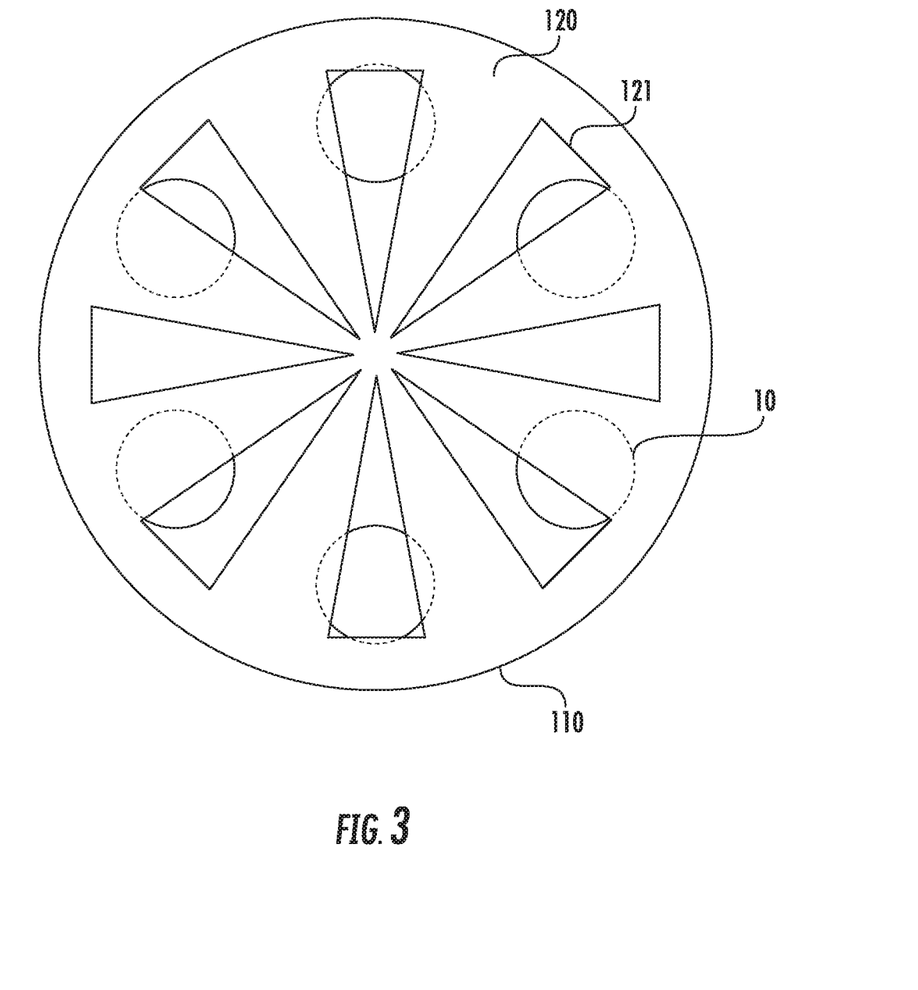
FIG. 3 shows a top view of the baseplate and rotating plate of the semiconductor processing device.

In operation, the rotating plate 110 rotates relative to the baseplate 120. FIG. 3 represents a top view showing only the baseplate 120 with the rotating plate 110 disposed under it. The baseplate 120 has a plurality of apertures 121, which may be wedge shaped. Disposed under the baseplate 120 is the rotating plate 110, which holds a plurality of workpieces 10. As the rotating plate 110 rotates relative to the baseplate 120, the workpieces 10 pass beneath the apertures 121 for a limited period of time. The portion of the workpiece 10 that is disposed directly beneath the aperture 121 may be processed, while the rest of the workpiece 10 is not processed.

While the figures show eight apertures 121, any number of apertures 121 may be used. Further, the size and shape of the apertures 121 is not limited by this disclosure. The use of eight wedge shaped apertures is merely illustrative and not limiting.

Returning to FIG. 2, the lid 130 may also have one or more observation windows 133 disposed on the top surface 131. An observation window 133 may be disposed directly above one of the apertures 121. In certain embodiments, the observation window 133 may be constructed of zinc selenide, germanium, silicon, zinc sulfide or other materials that are good infrared transmissive materials.

An infrared camera 200 may be disposed above one of these observation windows 133 and pointed downward. In this way, the infrared camera 200 may be aimed toward the aperture 121 so that the infrared camera 200 is able to see the workpieces 10 as the workpieces 10 rotate under the aperture 121. In other words, infrared camera 200 may be positioned so that the optical axis of the infrared camera 200 passes through the observation window 133 and the aperture 121. The infrared camera 200 may be a long wave infrared camera, although other types may also be employed. For example, the infrared camera 200 may be a midwave camera or a short wave IR camera.

In certain embodiments, a light blocking structure 140 may be disposed within the process chamber, above one of the apertures 121. The light blocking structure 140 is used to minimize the introduction of stray light from the process chamber to the infrared camera 200. In certain embodiments, the light blocking structure 140 may also introduce errors into the signal seen by the infrared camera 200. For example, the light blocking structure 140 is very close to the warm workpiece that is being measured. The energy from the light blocking structure 140 may be reflected from the workpiece back into the infrared camera 200. In one embodiment, the inside of the light blocking structure is coated with a low emissivity coating. This may achieve two objectives. First, the low emissivity coating may reduce the amount of energy absorbed by the light blocking structure 140, thus keeping the light blocking structure 140 cool. Second, the low emissivity coating also emits very little signal back toward the workpiece 10 that could be reflected back into the infrared camera 200, thus reducing measurement error.

Figure 4:
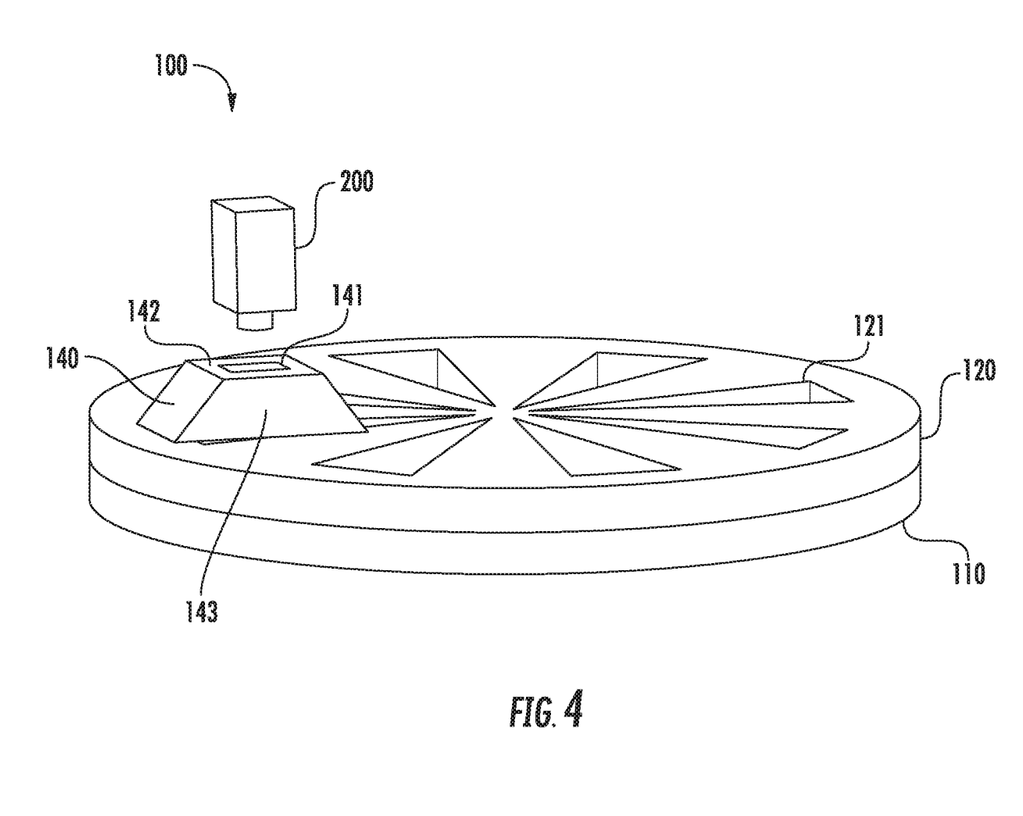
FIG. 4 shows a view of the semiconductor processing device of FIG. 2 with the lid made invisible.

FIG. 4 shows the semiconductor processing device 100 with the lid 130 rendered invisible. As can be seen in this figure, the light blocking structure 140 is disposed on the baseplate 120 directly above one of the apertures 121. The light blocking structure 140 is hollow and has an open base. The sides 143 of the light blocking structure 140 may be constructed of a material that does not permit the passage of infrared light. In one embodiment, the sides 143 of the light blocking structure 140 may be aluminum. The sides 143 of the light blocking structure 140 may be tapered so that the light blocking structure 140 has a larger base than top surface 142. In certain embodiments, each of the sides 143 of the light blocking structure 140 may be trapezoidal in shape. As mentioned above, in certain embodiments, the interior of the light blocking structure 140 may be coated with a low emissivity coating to minimize heat transfer and reflections.

The top surface 142 of the light blocking structure 140 may have a viewing aperture 141. This viewing aperture 141 is aligned with the infrared camera 200 so that the infrared camera 200 is able to see through to the workpiece 10 disposed under the aperture 121. In other words, the optical axis of the infrared camera 200 may pass through the observation window 133, the viewing aperture 141 and the aperture 121. The top surface 142 of the light blocking structure 140 may press against the underside of the top surface 131 of the lid 130 to minimize the introduction of stray light to the infrared camera 200.

In certain embodiments, the viewing aperture 141 may simply be an opening in the top surface 142 of the light blocking structure 140. In other embodiments, the viewing aperture 141 may be a material that is transparent to infrared light, such as but not limited to zinc selenide (ZnSe) or germanium.

In certain embodiments, the viewing aperture 141 may be tilted relative to the lid 130 to minimize reflections from the infrared camera 200 back toward itself. Another embodiment involves tilting the infrared camera 200 slightly so the optical axis of the infrared camera 200 is not orthogonal to the workpiece. This helps eliminate images of the infrared camera 200, which is much cooler than the workpiece, from reflecting back into the scene being measured. Thus, in certain embodiments, the system is configured such that the optical axis of the infrared camera 200 is not orthogonal to the plane of the viewing aperture 141. In certain embodiments, the system is configured such that the optical axis of the infrared camera 200 is not orthogonal to the plane of the workpiece 10.

As described above, in certain embodiments, the interior of the light blocking structure 140 may be coated with a low emissivity coating to minimize heat transfer and reflections.

Figure 7A:
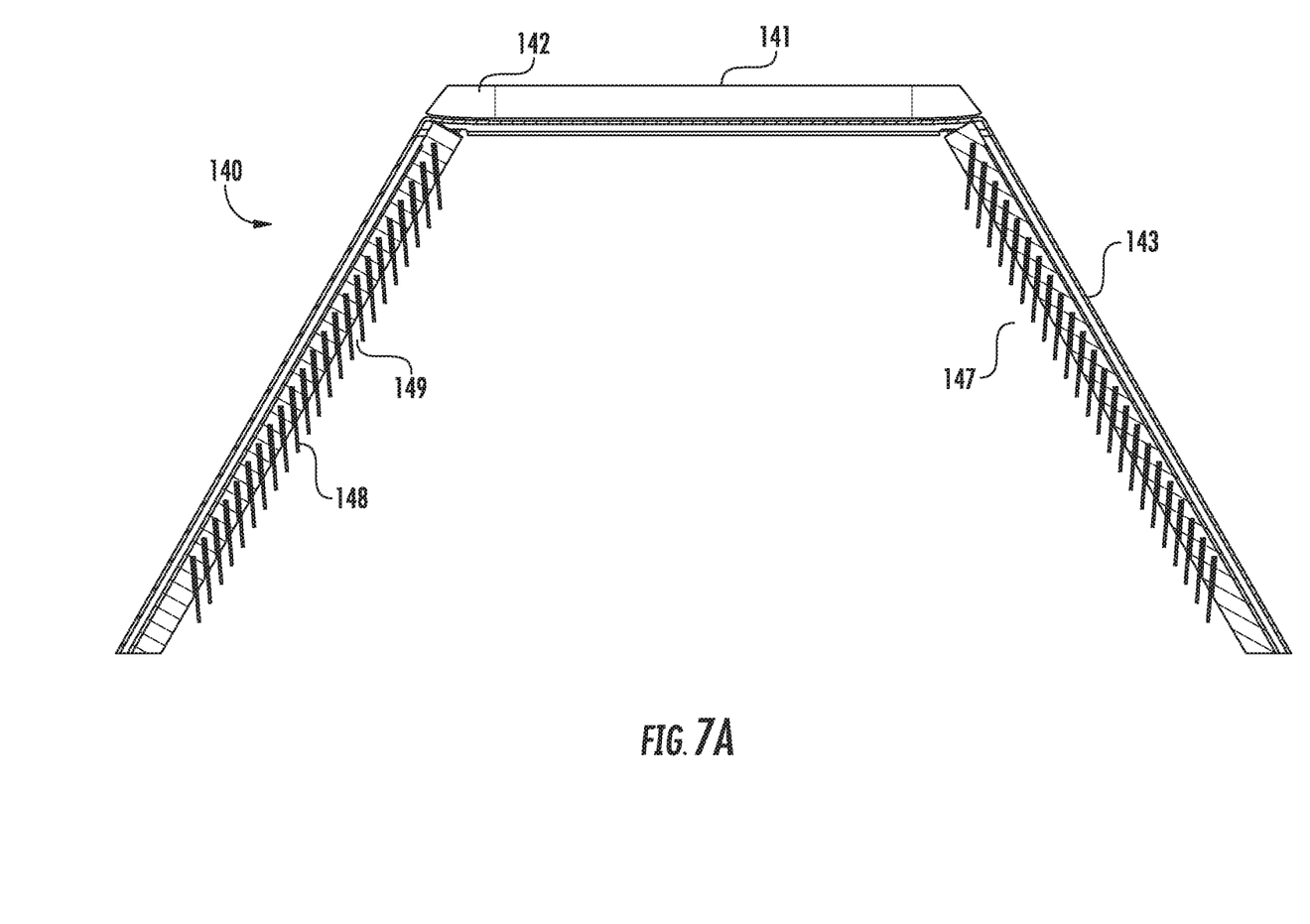
FIG. 7A shows a cross section of a light blocking structure according to one embodiment.
Figure 7B:
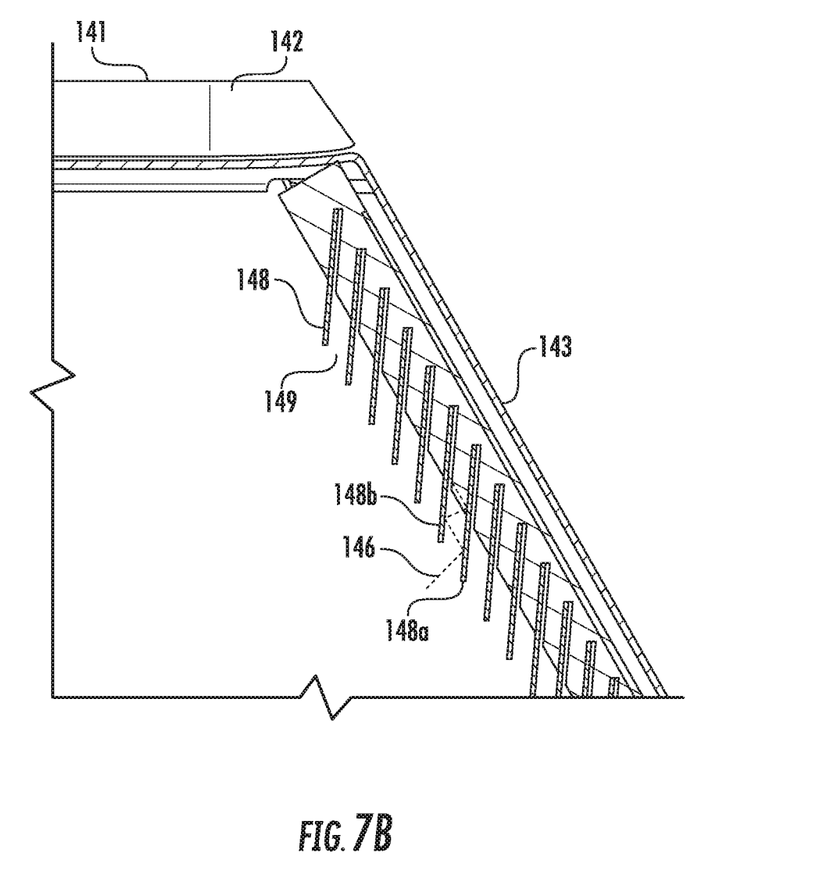
FIG. 7B is an enlarged view of a portion of the light blocking structure.

FIG. 7A shows a cross-section of a light blocking structure 140 according to another embodiment. In this embodiment, the light blocking structure 140 is trapezoidal shaped with a viewing aperture 141 disposed on the top surface 142. The inner walls of one or more sides 143 of the light blocking structure 140 may be lined with a light trap 147. The light trap 147 comprises a plurality of low emissivity members 148 attached to the inner surface of one or more sides 143. These low emissivity members 148 may be arranged parallel to one another, with a space 149 between adjacent low emissivity members 148. In certain embodiments, the low emissivity members 148 may be metal. In certain embodiments, the low emissivity members 148 may be thin blade-like structures. FIG. 7B shows an enlarged view of the low emissivity members 148 attached to the inner surface of the side 143. In operation, light 146 that enters the light trap 147 reflects off a first low emissivity member 148a. The light 146 then is directed upward toward an adjacent second low emissivity member 148b. The light 146 is then reflected again back toward the first low emissivity member 148a. Each time the light 146 is reflected, some energy is lost. In this way, light 146 entering the light trap 147 remains trapped within the light trap 147. This minimizes the light that is reflected back toward the infrared camera 200.

Figure 5:
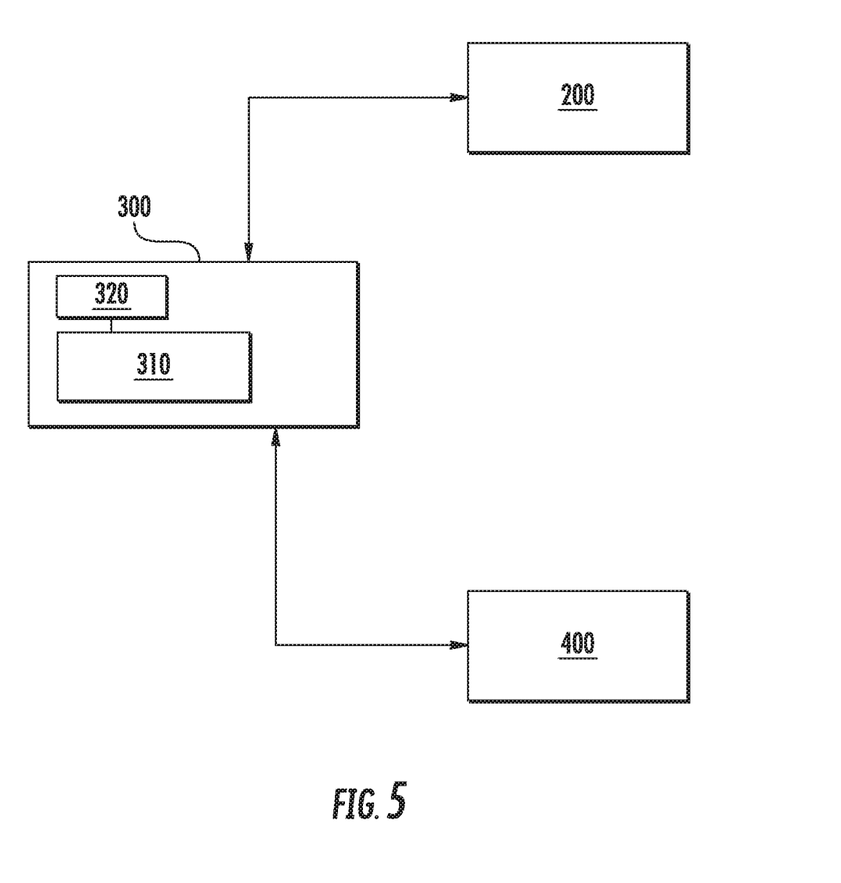
FIG. 5 shows a diagram of the control system for the temperature measurement system according to one embodiment.

FIG. 5 shows a control system used with the temperature measurement system. The control system comprises the infrared camera 200, which is in communication with a controller 300. The controller 300 optionally may also be in communication with the motor 400 driving the rotating plate 110.

The controller 300 comprises a processing unit 310 and a memory device 320. The processing unit 310 may be any suitable processor, including, for instance, a personal computer, server, custom microcontroller or other device. The memory device 320 may be any device capable of storing information, such as a semiconductor memory device, including a random access memory (RAM), read only memory (ROM), FLASH ROM, dynamic RAM (DRAM) or electrically erasable ROM (EEROM). The memory device 320 may also be an optical device, such as a compact disc (CD) or a magnetic device, such as a hard disk drive. Any of these technologies may be used to storage information. The memory device 320 is a non-transitory storage element, which is used to contain the instructions used by the processing unit 310. Those instructions, when executed by the processing unit, enable the temperature measurement system to perform the functions described herein. Additionally, the memory device 320 may also hold other information, such as data, tables and images. The controller 300 may also have other functions. For example, the controller 300 may have a network interface to communicate with other devices. In certain embodiments, the controller 300 may have a display device, such as a monitor or printer, which may be used to display the temperature imaging data obtained by the temperature measurement system.

In operation, the controller 300 may communicate with the infrared camera 200 and instruct the infrared camera 200 to take thermal images at selected times. In other embodiments, the infrared camera 200 may take thermal images at predetermined intervals without any instruction from the controller 300. The thermal images captured by the infrared camera 200 are transmitted to the controller 300. This may be achieved via a wired connection or a wireless connection.

In one embodiment, the motor 400 may have an encoder which provides information about the rotational position of the rotating plate 110 at any particular time. The controller 300 may associate each thermal image received from the infrared camera 200 with rotational position information received from the motor 400. This information is then stored in the memory device 320 with the associated thermal image. Since each of these thermal images represents only a portion of the workpieces that are to be measured, these thermal images may be combined to form a single thermal image of all of the workpieces. This combined thermal image may be referred to as a stitched thermal image or as a complete thermal image.

This procedure continues as the rotating plate 110 makes at least one revolution. In certain embodiments, the rotating plate 110 may make more than one revolution while the thermal imaging data is being collected. In certain embodiments, the rotating plate 110 may rotate at about 1 revolution per minute, although other rotational speeds may be used. Further, in certain embodiments, over one thousand thermal images may be captured during this procedure.

After the rotating plate 110 has completed at least one revolution, the controller 300 may stitch together the plurality of thermal images captured by the infrared camera 200 to form a single image, showing all of the workpieces. As stated above, this may be referred to as a stitched thermal image or a complete thermal image. This function may be performed by the processing unit 310 executing software disposed within the memory device 320 of the controller 300. This software may be referred to as stitching software.

One such complete thermal image 500 is shown in FIG. 6. This complete thermal image shows that the rotating plate 110 carried five workpieces, while one position on the rotating plate 110 does not show a workpiece. This may be due to the fact that the position was vacant, or alternatively, the workpiece disposed in that position may not have any coating on it, making that workpiece invisible relative to the underlying rotating plate 110.

To show the capability of the temperature measurement system, each workpiece was coated using a different pattern. Workpiece 510a was coated using the pattern shown in FIG. 1A, while workpieces 510b, 510d were coated using the pattern using in FIG. 1B. Workpiece 510c was coated with a pattern to aid in focusing the camera and quantifying the resolution of the camera, while workpiece 510e was coated with a pattern of dots which may be used to align the stitching software.

This complete thermal image is created by joining together the plurality of separate thermal images captured by the infrared camera 200 into one thermal image that represents the entire rotating plate 110.

The embodiment presented above described an embodiment where the thermal images are associated with a rotational position of the rotating plate 110. However, other embodiments are also possible. For example, in one embodiment, each thermal image captured by the infrared camera 200 is timestamped. The thermal images may then be stitched together using the timestamp to determine the proper order of the thermal images. In some embodiments, the thermal images may be taken over multiple revolutions of the rotating plate 110. In this embodiment, the proper position of a thermal image may be based on the timestamp as well as the period of the rotating plate 110. Of course, other time related information may be used instead of a time stamp. For example, the order in which the thermal images are stored may indicate the temporal sequence and be used to stitch the thermal images together.

Of course, other methods may be used to create a single thermal image from a plurality of smaller thermal images captured as the rotating plate 110 rotates. For example, if adjacent thermal images have overlapping portions, image matching may be used to stitch together the plurality of thermal images.

Once the single thermal image has been created, the thermal image may be used for various purposes. In one embodiment, the thermal image shows the temperature uniformity of the rotating plate 110. For example, the single thermal image may show that one or more of the workpieces are warmer than others of the workpieces. Additionally the single thermal image may be used to determine temperature uniformity across each workpiece. For example, the outer portion of a particular workpiece (i.e. the portion furthest from the axis of rotation) may be cooler than the inner portion of that workpiece. These findings may then be used as inputs to a temperature control system, used to heat or cool the workpieces in the semiconductor processing device 100.

In certain embodiments, the same pixel or location may appear in multiple thermal images. The thermal data for that pixel may vary between thermal images. However, the stitched image selects only one thermal value for that pixel. A variety of different options may be used to determine how that value is determined. For example, the average value, the maximum, minimum or a weighted average may be displayed in the stitched image.

While the present disclosure describes the use of a thermal measurement system in a particular semiconductor processing device 100, the disclosure is not limited to this embodiment. Indeed, the temperature measurement system may be employed in any type of system. In certain embodiments, the temperature measurement system described herein is well suited for applications where the workpiece or workpieces are not entirely visible at any point in time. The use of an infrared camera and a controller with the associated stitching software can be used to create a single complete thermal image of a workpiece, or a plurality of workpieces, from a plurality of thermal images of the workpiece captured by the infrared camera 200.

The complete thermal image may serve many functions. In one embodiment, the complete thermal image is used to validate a semiconductor processing device. By creating the complete thermal image, it is possible to understand the temperature of the workpieces and the temperature uniformity within the process chamber. In another embodiment, the complete thermal image may be used to adjust heating and/or cooling parameters within the semiconductor processing device. For example, the complete thermal image may provide feedback that may be used to adjust the heating and/or cooling system of the semiconductor processing device. Of course, the complete thermal image can be used to perform other functions as well, and the above description is not intended to limit the applicability or utility of the complete thermal image.

Thus, to perform a temperature validation process for a semiconductor processing device, the following sequence may be performed. First, one or more workpieces, designated as test workpieces, may be treated such that a coating is disposed on a portion of the surface of each of the workpieces. This may be achieved using any of the techniques described above. The test workpieces are then disposed on the rotating plate. Operation of the semiconductor processing chamber may then be commenced. For example, heating elements disposed in the rotating plate may be actuated so that the test workpieces are heated in the manner as would be performed in normal operation. The motor for the rotating plate is also actuated so that the test workpieces are rotated. Once the rotating plate is at the desired temperature and rotational speed, the controller may initiate the temperature measurement. This may be achieved by instructing the infrared camera to begin capturing thermal images at a predetermined interval. As discussed above, this plurality of thermal images is transmitted to the controller. After the rotating plate has completed at least one revolution, the controller assembles the plurality of thermal images into a complete thermal image. If necessary, adjustments may be made to the heating and/or cooling elements of the semiconductor processing device to insure that the temperature of each workpiece is at the desired temperature and thermal uniformity. The creation of a complete thermal image may be repeated until satisfactory results are achieved. After the temperature of the semiconductor processing device has been validated, the test workpieces may be removed. At this time, the semiconductor processing device may be made fully operational and loaded with workpieces for processing.

The embodiments described herein have many advantages. In certain semiconductor processing devices, it may be of interest to know the actual temperature of the workpieces in the process chamber. However, the structure of the semiconductor processing device may make such temperature measurement difficult. By employing a temperature measurement system that is able to combine a plurality of thermal images together to form a single complete thermal image, it becomes possible to better understand temperature and temperature uniformity in the process chamber. Further, the present temperature measurement system is particularly useful in embodiments where the entirety of the workpiece is not visible at once. The stitching software described herein allows a complete thermal image of the workpiece to be stitched together from a plurality of thermal images which each show only a portion of the workpiece. Further, by limiting the amount of coating applied to the workpiece, the temperature of the workpiece during the measurement is minimally affected.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An apparatus for capturing a thermal image of a workpiece, comprising:
    a workpiece processing device having a process chamber and an observation window;
    a workpiece disposed in the workpiece processing device, the workpiece having a coating disposed on a portion of a surface;
    an infrared camera disposed outside the process chamber and adapted to capture thermal images of the workpiece in the workpiece processing device through the observation window; and
    a controller, in communication with the infrared camera, wherein the infrared camera captures a plurality of thermal images of the workpiece, and transmits the plurality of thermal images to the controller; and
    wherein the controller assembles the plurality of thermal images into a single complete thermal image showing an entirety of the workpiece.

2. The apparatus of claim 1, wherein the workpiece processing device comprises a rotating plate on which the workpiece is disposed, such that the workpiece moves relative to the infrared camera, and the thermal images each capture a portion of the workpiece, less than an entirety of the workpiece.

3. The apparatus of claim 2, wherein the workpiece processing device comprises a baseplate disposed between the rotating plate and the infrared camera, the baseplate having an aperture therein such that only the portion of the workpiece disposed beneath the aperture is visible to the infrared camera.

4. The apparatus of claim 3, further comprising a light blocking structure, having an open base and a top surface with a viewing aperture, the light blocking structure disposed in the process chamber with the base of the light blocking structure disposed on the aperture in the baseplate, and the infrared camera positioned so that an optical axis of the infrared camera passes through the viewing aperture.

5. The apparatus of claim 4, wherein a light trap is disposed on an interior surface of the light blocking structure.

6. The apparatus of claim 4, wherein the viewing aperture comprises a material transparent to infrared light, and the viewing aperture is not orthogonal to the optical axis of the infrared camera.

7. An apparatus for capturing a thermal image of a workpiece, comprising:
    a workpiece processing device having a process chamber, the process chamber defined by a lid and a baseplate;
    the baseplate having an aperture therein, the aperture configured to be smaller than a workpiece;
    a rotating plate disposed beneath the baseplate;
    a workpiece disposed on the rotating plate, the workpiece having a coating disposed on a portion of a surface;
    an infrared camera disposed outside the process chamber and adapted to capture thermal images of the workpiece through an observation window in the lid, wherein an optical axis of the infrared camera passes through the observation window and the aperture in the baseplate; and a controller, in communication with the infrared camera, wherein the infrared camera captures a plurality of thermal images of the workpiece as the workpiece moves on the rotating plate, and transmits the plurality of thermal images to the controller; and wherein the controller assembles the plurality of thermal images into a single complete thermal image showing an entirety of the workpiece.

8. The apparatus of claim 7, further comprising a light blocking structure, having an open base and a top surface with a viewing aperture, the light blocking structure disposed in the process chamber with the base of the light blocking structure disposed on the aperture in the baseplate, and the infrared camera positioned so that the optical axis of the infrared camera passes through the viewing aperture.

9. The apparatus of claim 8, wherein the viewing aperture comprises a material transparent to infrared light, and the viewing aperture is not orthogonal to the optical axis of the infrared camera.

10. The apparatus of claim 8, wherein an inside surface of the light blocking structure is coated with a low emissivity coating.

11. The apparatus of claim 8, wherein the light blocking structure comprises a plurality of walls constructed of a material that do not permit passage of infrared light.

12. The apparatus of claim 8, wherein a light trap is disposed on an interior surface of the light blocking structure.

13. The apparatus of claim 12, wherein the light trap comprises a plurality of low emissivity members and surfaces arranged in parallel and attached to an interior surface of a side of the light blocking structure.

14. The apparatus of claim 7, wherein the rotating plate holds a plurality of workpieces, and the controller creates a complete thermal image showing all of the plurality of workpieces disposed on the rotating plate.

15. The apparatus of claim 7, wherein the coating covers less than 20% of a total surface of the workpiece.

16. A temperature measurement system, comprising:
an infrared camera;
a rotating plate to hold a workpiece, the workpiece having a coating disposed on a portion of the workpiece, less than an entirety of the workpiece, wherein the workpiece moves relative to the infrared camera; and
a controller in communication with the infrared camera, wherein the infrared camera captures a plurality of thermal images of the workpiece, where each thermal image captures less than an entirety of the workpiece, and transmits the plurality of thermal images to the controller; and
wherein the controller assembles the plurality of thermal images into a single complete thermal image showing an entirety of the workpiece.

17. The temperature measurement system of claim 16, wherein position information of the rotating plate is associated with each of the plurality of thermal images and the controller uses the position information to create the single complete thermal image.

18. The temperature measurement system of claim 16, wherein time information is associated with each of the plurality of thermal images and the controller uses the time information to create the single complete thermal image.

19. The temperature measurement system of claim 16, wherein adjacent thermal images have an overlapping portion, and the controller uses image matching to create the single complete thermal image.

20. The temperature measurement system of claim 16, wherein the coating covers less than 20% of a total surface of the workpiece.

* * * * *